(12) United States Patent
Ellis

(10) Patent No.: US 12,006,167 B2
(45) Date of Patent: Jun. 11, 2024

(54) VALVE WITH PRESSURE SEAL PROTECTION

(71) Applicant: SCHENCK PROCESS EUROPE GMBH, Darmstadt (DE)

(72) Inventor: Richard Ellis, Darmstadt (DE)

( * ) Notice: Subject to any disclaimer, the term of this patent is extended or adjusted under 35 U.S.C. 154(b) by 358 days.

(21) Appl. No.: 17/434,792

(22) PCT Filed: Feb. 28, 2020

(86) PCT No.: PCT/EP2020/055359
§ 371 (c)(1),
(2) Date: Aug. 30, 2021

(87) PCT Pub. No.: WO2020/178201
PCT Pub. Date: Sep. 10, 2020

(65) Prior Publication Data
US 2022/0162018 A1 May 26, 2022

(30) Foreign Application Priority Data

Mar. 1, 2019 (GB) ..................... 1902828

(51) Int. Cl.
*B65G 53/46* (2006.01)
*B01J 8/00* (2006.01)
(Continued)

(52) U.S. Cl.
CPC ........ *B65G 53/4658* (2013.01); *B01J 8/0045* (2013.01); *B01J 19/0073* (2013.01);
(Continued)

(58) Field of Classification Search
CPC ...... F16K 5/201; F16K 5/205; B65G 53/4658
See application file for complete search history.

(56) References Cited

U.S. PATENT DOCUMENTS 4,074,889 A * 2/1978 Engel ...................... F16K 1/221
251/298
4,137,935 A * 2/1979 Snowdon ........... B65G 53/4658
251/298
(Continued)

FOREIGN PATENT DOCUMENTS

CN 103708232 A * 4/2014
CN 103708232 A 4/2014
(Continued)

OTHER PUBLICATIONS

International Search Report dated Jun. 18, 2020 for PCT/EP2020/055359.

*Primary Examiner* — David Colon-Morales
(74) *Attorney, Agent, or Firm* — Barnes & Thornburg LLP

(57) ABSTRACT

Disclosed is a valve for use in particulate material processing. The valve has a rotatable closure member having a convex sealing surface and a resilient sealing ring moveable between a first configuration in which the sealing ring forms a seal around a circumference of the convex sealing surface; and a second position in which a circumferential gap is defined between the convex sealing surface and the sealing ring. The valve body defines a fluid-directing surface extending around the fluid passage between the inlet and the sealing ring to define an annular clearance which tapers towards the sealing ring and becomes narrower than the annular gap. When there is a pressure drop across the valve and before the closure member is moved to fully open the valve, material flowing through the valve experiences a dynamic pressure rise towards the circumferential gap, decreasing flow velocity and wear.

20 Claims, 3 Drawing Sheets

(51) Int. Cl.
*B01J 19/00* (2006.01)
*B65D 90/54* (2006.01)
*B65G 53/50* (2006.01)
*B65G 53/58* (2006.01)
*B65G 53/66* (2006.01)
*F16K 5/20* (2006.01)
*F16K 31/04* (2006.01)

(52) U.S. Cl.
CPC ............. *B65D 90/54* (2013.01); *B65G 53/50* (2013.01); *B65G 53/58* (2013.01); *B65G 53/66* (2013.01); *F16K 5/201* (2013.01); *F16K 5/205* (2013.01); *F16K 31/041* (2013.01); *B01J 2208/00619* (2013.01); *B01J 2219/00184* (2013.01); *B65G 2812/1616* (2013.01); *B65G 2812/1641* (2013.01)

(56) References Cited

U.S. PATENT DOCUMENTS

| | | | | |
|---|---|---|---|---|
| 4,519,579 A | * | 5/1985 | Brestel | F16K 5/204 251/177 |
| 4,795,132 A | * | 1/1989 | Ells | F16K 3/207 251/159 |
| 5,101,853 A | * | 4/1992 | Mailliet | F16K 5/207 251/303 |
| 5,642,751 A | * | 7/1997 | Crawley | F16K 49/007 137/340 |
| 6,050,289 A | * | 4/2000 | Flores-Verdugo | F16K 49/005 137/340 |
| 6,206,024 B1 | * | 3/2001 | Naberhaus | F16K 27/067 251/308 |
| 6,213,450 B1 | * | 4/2001 | Palmer | F16K 5/205 137/239 |
| 6,805,332 B2 | * | 10/2004 | Crawley | F16K 5/205 251/249.5 |
| 9,079,145 B2 | * | 7/2015 | Baranowski | B01J 8/003 |
| 10,184,573 B2 | * | 1/2019 | Snowdon | F16K 5/205 |
| 11,739,848 B2 | * | 8/2023 | Newton | F16K 5/06 251/301 |
| 2011/0194905 A1 | * | 8/2011 | Murayama | C10L 3/06 406/14 |
| 2012/0319023 A1 | | 12/2012 | Naberhaus | |

FOREIGN PATENT DOCUMENTS

| | | | | |
|---|---|---|---|---|
| DE | 0512324 A1 | * | 11/1992 | |
| EP | 0883763 B1 | | 5/2003 | |
| GB | 1539079 A | * | 1/1979 | ......... B65G 53/4658 |
| GB | 1539079 A | | 1/1979 | |
| GB | 2537134 A | * | 10/2016 | ............ B65G 53/46 |
| GB | 2537134 A1 | | 10/2016 | |
| KR | 20190022426 A | | 3/2019 | |
| WO | WO-9735130 A2 | * | 9/1997 | .......... F16K 49/005 |
| WO | 2015063473 A1 | | 5/2015 | |

\* cited by examiner

VALVE WITH PRESSURE SEAL PROTECTION

CROSS REFERENCE TO RELATED APPLICATIONS

The present application claims priority to PCT/EP2020/055359, filed Feb. 28, 2020 which claims the benefit of GB Application No. 1902828.1 filed Mar. 1, 2019, each of which is hereby incorporated by reference in their entirety.

FIELD OF THE INVENTION

The invention relates to a valve and in particular to a valve for use in pneumatic conveying of particulate material.

BACKGROUND OF THE INVENTION

Pneumatic conveying by pressure or vacuum are techniques employed to transport particulate materials along a pipeline. These techniques are typically employed to transport materials over distances typically in the range from 10 m to 500 m, and in some cases even further. Pneumatic conveying avoids the need for the use of conveyor belts or the like, which can be bulky and costly to maintain.

Pneumatic conveying techniques are particularly useful where material has to be transported along a complex path, or to multiple delivery points. These techniques also ensure that the particulate material can be entirely contained within a pipeline, which may avoid the need to deal with dust from or contamination of the material along the path of the conveying pipeline.

Pneumatic conveying, and other stages of material handling, may be conducted at an elevated pressure, or may use pressure differentials between different parts of a conveying or material handling facility. For example, dense phase positive pressure or vacuum pneumatic conveying is often used to transport dense phase particulates that are not suitable for conveying by suspension in a gas flow, such as materials prone to particulate breakage, or particularly abrasive or friable materials.

A conventional pressurised dense phase pneumatic conveying system includes a hopper, from which particulate material is delivered into a pressure vessel. The pressure vessel is pressurised with (typically) compressed air, and particulate material is delivered under pressure into a conveying pipeline. The pressurised air in the pressure vessel expands into the conveying pipeline and propels the particulate material along the pipeline to a delivery point at a lower (e.g. ambient) pressure.

The inlet valve between the pressure vessel and the conveying pipeline, or indeed any valve delivering a flow including particulate material across a pressure differential, must be capable of opening and closing in the presence of particulates and must have a suitable working lifetime.

GB1539079 (Macawber Engineering) describes an inlet valve for use with a vessel that contains pressurized powder. The valves described in GB1539079 are commonly referred to as "dome valves" and are in common use today in particulate material processing, such as dense phase conveying and process injection technology. A conventional dome valve is shown in FIGS. 1 and 2 and described in further detail below.

A dome valve includes a "dome" shaped closure member with a with a convex sealing surface, typically defining a part of a spherical surface. When the valve is closed, the closure member blocks a channel extending through the valve and an inflatable sealing member forms a seal around a circumference of the closure member. The sealing member is deflated, to create a circumferential gap or clearance between the sealing surface and the sealing member, and this allows the closure member to be rotated away from the aperture.

The inflatable and deflatable sealing member prevents sliding contact with the sealing surface of the closure member during opening and closing, to avoid wear. Moreover, the sealing member can provide a gas tight seal even with powder contamination In order for the sealing member to achieve a forceful seal without suffering seal extrusion, and for sufficiently rapid operation, the clearance between the inflatable seal and the rotating dome component is small, typically in the range 0.4-2 mm.

In use, when there is a pressure drop across the valve, in the short period between seal deflation and the closure member moving to its fully open position, pressurized gas and powder flows through this gap, wearing and eroding the sealing member and domed surface of the closure member. In practice, it has been found if the pressure difference across this gap is greater than around 1.5 bar, the lifespan of the inflatable sealing member is unacceptably short.

The velocity of the flow of gas increases through the circumferential gap, in comparison to the velocity through the valve inlet. In addition, the dynamic pressure between the closure member and the sealing member is lower than at the inlet. This has the effect of driving more fluidized particulate material through the circumferential gap, exacerbating the problem of excessive wear.

This effect has limited the range of applications for dome valves to date. Dome valves cannot, for example, be used effectively as an outlet valve on high pressure conveying systems (with operating pressures of 4-10 barg, or in some circumstances as high as 30 barg).

There remains a need for valves to address or mitigate at least one or more of the aforementioned problems.

SUMMARY OF THE INVENTION

According to a first aspect of the invention there is provided a valve comprising:
   a body defining an inlet, an outlet and a fluid passage extending between the inlet and the outlet; the valve comprising:
   a closure member disposed in the fluid passage between the inlet and the outlet, having a convex sealing surface;
     wherein the closure member is rotatable between a closed position in which the closure member extends across the fluid passage with the convex sealing surface oriented towards the inlet; and an open position in which fluid is able to flow through the fluid passage from the inlet to the outlet;
   a resilient sealing ring extending around the fluid passage between the inlet and the outlet; and, when the closure member is in the closed position;
     wherein the sealing ring is moveable between a first configuration in which the sealing ring forms a seal around a circumference of the convex sealing surface; and a second position in which the valve comprises a circumferential gap between the convex sealing surface and the sealing ring;
   wherein the body defines a fluid-directing surface extending around the fluid passage between the inlet and the sealing ring; and when the closure member is in the closed position, an annular clearance is defined between the fluid-directing surface and the convex sealing surface, which tapers towards the sealing ring to a minimum annular clearance, wherein the minimum annular clearance is less than the circumferential gap.

In use, when there is a pressure drop across the valve, in the period following movement of the sealing ring from the first to the second configuration, before the closure member is moved towards the open position, there is a dynamic pressure rise between the minimum annular clearance and the circumferential gap. There is a corresponding decrease in the velocity of the gas and particulate material flowing therethrough, and a reduction of erosive and impact wear on the sealing ring and closure member.

The tapered annular clearance may also promote "packing" of particulate material between the sealing surface of the closure member and the fluid-directing surface, which may further limit the overall mass flow rate past the sealing member, through the circumferential gap, until the closure member has moved.

The minimum annular clearance is determined at the part of the fluid-directing surface which is closest to the convex sealing surface.

In some embodiments, the minimum annular clearance is between around 0.01 to 1 mm, or between around 0.03 to 0.7 mm or between around 0.05 to 0.5 mm. The minimum annular clearance may be around 0.1 mm, 0.2 mm, 0.3 mm, 0.4 mm The minimum annular clearance is preferably even around the fluid passage, within the range of normal mechanical tolerances.

The circumferential gap is determined at the part of the sealing ring which is closes to the convex sealing surface. It will be understood that portions of the sealing ring to either side may be further from the convex sealing surface.

The circumferential gap may be at least around 1.5 times or 1.75 times greater than the minimum annular clearance. The circumferential gap may be at least around twice or three times (or more) greater than the minimum annular clearance.

The circumferential gap may be between around 0.1-4 mm, or 0.2-3 mm, or between around 0.4-2 mm. The circumferential gap may be around 0.5 mm, 1 mm, 1.5 mm or 2 mm.

The fluid-directing surface may have a length dimension that is at least 10 times, or 20 times, or 30 times or 40 times as large as the minimum annular clearance. In use, this length of fluid-directing surface defines a tapered fluid pathway that promotes a gradual acceleration of gas and particulate material towards the minimum annular clearance.

The length dimension of the fluid-directing surface is a dimension along the surface in a direction perpendicular to a locus of points around the minimum annular clearance (for example a radial length, in embodiments of the valve having a central axis, as discussed below).

In cross section through the length dimension, the fluid-directing surface may be straight or curved (convex or concave). For example, in embodiments wherein the fluid-directing surface is circularly symmetric around a central axis, the fluid-directing surface may be generally frustoconical.

It should be understood that the fluid-directing surface is oriented to generally face towards the sealing surface (and thus towards the outlet), when the closure member is in the closed position.

At least in the region of the fluid-directing surface and the sealing ring, the fluid passage (and thus the fluid-directing surface and sealing ring) may be symmetric around a central axis. The fluid-directing surface and sealing ring may be circularly symmetric or may describe an oval symmetry. In some embodiments, when viewed down the axis, other symmetries may be possible, such as a square or rectangular symmetry (for example wherein the sealing ring and fluid-directing surfaces are saddle shaped).

The valve body may be symmetric around the central axis, at least in the portion defining the fluid passage in the region of the sealing ring and fluid-directing surface.

The fluid passage may extend along the central axis.

The closure member may be rotatable around an axis perpendicular to the central axis. Rotation of the closure member may be achieved electromechanically, mechanically, of may be fluid-actuated (e.g. hydraulically or pneumatically). The valve may be a solenoid valve. The valve may be a pneumatic or a hydraulic valve.

When the closure member is in the closed position, the convex sealing surface may be oriented generally towards the inlet. When the closure member is in the open position, the closure member may be rotated by up to 90 degrees, such that the convex sealing surface is moved out of the fluid passage or as far to the side thereof as possible, so as to maximise flow area through the valve.

The convex sealing surface may be a part spherical surface (for example wherein the fluid passage in the region thereof is circularly symmetric) or may in alternative embodiments be a part ovoid surface, or a part cylindrical surface.

The convex sealing surface and/or the fluid-directing surface may, at least in the region of the annular clearance, be provided with a relatively rough surface finish. A roughened surface may promote "packing" of particulate material in the annular clearance in use.

Surface roughness may be given in Ra (profile roughness) values measured in accordance with ISO 1302:1992, i.e. the average deviation of surface discontinuities from a mean time. Ra may be determined by contact, or non-contact (optical) means, as known in the art. The appropriate surface roughness may be selected in accordance with the intended use of the valve, based for example on the average particle size of the particulate material.

A typical surface roughness for one or both surfaces may be in the range of around 0.1-10 μm. The roughness of one or both surfaces may be in the range of around 0.1-7, 0.5-8, 1-7, 1.5-7, or around 1.6-6.3 μm.

The fluid-directing surface may form part of a fluid-directing ring, mounted to the other parts of the body. The fluid-directing ring may be moveable, so as to allow for adjustment of the minimum annular clearance. The fluid-directing ring may be removably mounted to the body, for example to allow for its replacement. A fluid-directing ring may, in some embodiments, be conveniently accessed via the inlet end of the body. Indeed, a fluid-directing ring may conveniently be retrofittable to existing valves of the same general type, lacking a fluid-directing surface as disclosed herein.

Any suitable means of mounting may be used, such as by way of an interference fit within the body. Adjustment may be provided by way of shims or the like, and/or a slideable fit locked in place by a grub screw.

The fluid-directing surface (and/or the sealing surface, at least in the region of the annular clearance) may be hardened, to resist erosion. For example, the surface may be of tungsten carbide, stellite or the like. Coatings of this nature are well known to one skilled in the art.

The sealing ring may comprise a resilient material such as an elastomer. By resilient we refer to capability of a material to be deformed and return to its original shape. Any suitable resilient material may be used for the sealing ring, such as a fluoropolymer (e.g. Viton (Viton is a trade mark) or PTFE) a polyurethane, a neoprene ora silicone material, a nitrile, a polypropylene (e.g. EPDM) or the like.

The sealing ring may comprise an inflatable portion. For example, pressurisable volume may be defined between the sealing ring and the body. The inflatable component or pressurised volume may be pressurised and depressurised to facilitate movement of the sealing ring between the first and second configurations.

In embodiments having a central axis (at least in the region of the sealing ring and the fluid-directing surface), the fluid-directing surface may be concentric within the sealing ring, when viewed along the central axis.

The fluid-directing surface in many embodiments is proximal to the sealing ring. That is to say that the minimum annular clearance may be positioned in the fluid passage immediately upstream (i.e. closer to the inlet) of the circumferential gap. The distance therebetween may for example be around 5 mm to 80 mm.

In another aspect, the invention extends to a method of flowing particulate material and carrier gas from the inlet to the outlet of a valve, under the action of a pressure drop across the valve from the inlet to the outlet, the method comprising:
  providing a valve having; a closure member disposed in a fluid passage that extends from the inlet to the outlet, the closure member having a convex sealing surface; and a resilient sealing ring extending around the fluid passage between the inlet and the outlet, the sealing ring being in a first configuration in which the sealing ring forms a seal around a circumference of the convex sealing surface;
  moving the sealing ring to a second configuration to provide a circumferential gap between the convex sealing surface and the sealing ring;
  flowing particulate material and carrier gas from the inlet to the outlet; by increasing the velocity of the flow to a maximum velocity at a minimum clearance between the inlet and the circumferential gap; and then decreasing the velocity of the flow through the circumferential gap.

The method may comprise flowing particulate material and carrier gas through a tapered annular clearance defined between a fluid-directing surface and the sealing surface; to a minimum annular clearance that is less than the said circumferential gap. The velocity of said flow may thereby be increased to its maximum velocity.

The method may comprise then flowing the particulate material through the circumferential gap. The velocity of said flow may thereby be reduced, as the circumferential gap is larger than the minimum annular clearance.

The pressure drop may be between around 0.5 and 15 bar. The pressure drop may be between around 0.5 and 5 bar, or 1 and 3 bar. The pressure drop may be around or above around 1 bar or 1.5 bar or 2 bar. The pressure drop may be around or above around 3 bar or 5 bar or 10 bar. In some embodiments the pressure drop may be from around 1.5 bar to 10 bar or even greater.

A valve in accordance with the invention may in some embodiments be used in higher pressure systems, for example running at pressures up to 30 or 40 barg. The pressure drop may be commensurately greater, for example around or above 10 bar, 20 bar, 25 bar or 30 bar. The pressure drop may be between 5-35 bar, 10-30 bar, 20-30 bar, for example.

The method may comprise rotating the closure member towards an open position in which fluid is able to flow through the fluid passage from the inlet to the outlet.

The method may comprise closing the valve, by moving the closure member from the open position to the closed position and subsequently moving the sealing member from the second configuration to the first configuration.

The method may comprise moving the sealing member between the first and second configurations pneumatically, by inflating/deflating the sealing member.

The method may comprise flowing particulate material and a carrier gas from a pressure vessel in communication with the valve inlet.

The method may comprise flowing particulate material into a conveying pipeline in communication with the valve outlet.

Accordingly, the method may be used in a method of particulate material conveying, such as dense phase material conveying.

The method may comprise use of the valve of the first aspect.

In a further aspect, the invention extends to a pressure vessel, having an outlet port coupled to the inlet of the valve of the first aspect. The valve may be coupled directly, or via a length of conduit or pipeline.

The pressure vessel may form part of a particulate material pneumatic system. The particulate material pneumatic system may for example be a particulate material conveying system, such as a dense phase conveying system, for transporting dense phase particulate materials such as sodium sulphate, sodium carbonate, sand, gypsum, alumina, metallurgical coke, clinker, metallic dust and concentrates, or other inorganic salts, catalyst substrates and the like. The particulate material pneumatic system may be used to convey fuels, such as coal, biomass or waste materials. The pressure vessel may for example be a transporter for a particulate material conveying apparatus.

The particulate material pneumatic system may be a batch feeding system, in which particulate material, such as the materials mentioned above, are dispensed in from a holding vessel in batches of a predetermined size. The particulate material system may be a lean phase conveying system (also known as "dilute phase" conveying, in which the ratio of conveying product to conveying gas, and typically also the conveying gas pressure, is lower than dense or medium phase pneumatic conveying).

The particulate material pneumatic system may be a gravimetric feeder, in which batch sizes are determined by monitoring weight changes in a portion of the apparatus. Typically, a gravimetric feeder comprises a holding vessel, and the batch sizes are determined by monitoring weight change of the holding vessel (and any ancillary apparatus that cannot be made independent e.g. by flexible conduits, of the holding vessel).

The invention also extends in another aspect to a particulate material conveying apparatus comprising a pressure vessel having an outlet port and a conveying pipeline having a conveying pipeline inlet and a conveying pipeline outlet; and a valve according to the first aspect therebeween, wherein the valve inlet is coupled (directly or indirectly) to the pressure vessel outlet, and the valve outlet is coupled (directly or indirectly) to the conveying pipeline inlet.

Further optional features disclosed in relation to each aspect of the invention correspond to further optional features of each other aspect of the invention.

BRIEF DESCRIPTION OF THE DRAWINGS

Non-limiting example embodiments the present invention will now be described with reference to the accompanying drawings in which.

DETAILED DESCRIPTION

Figure 1:
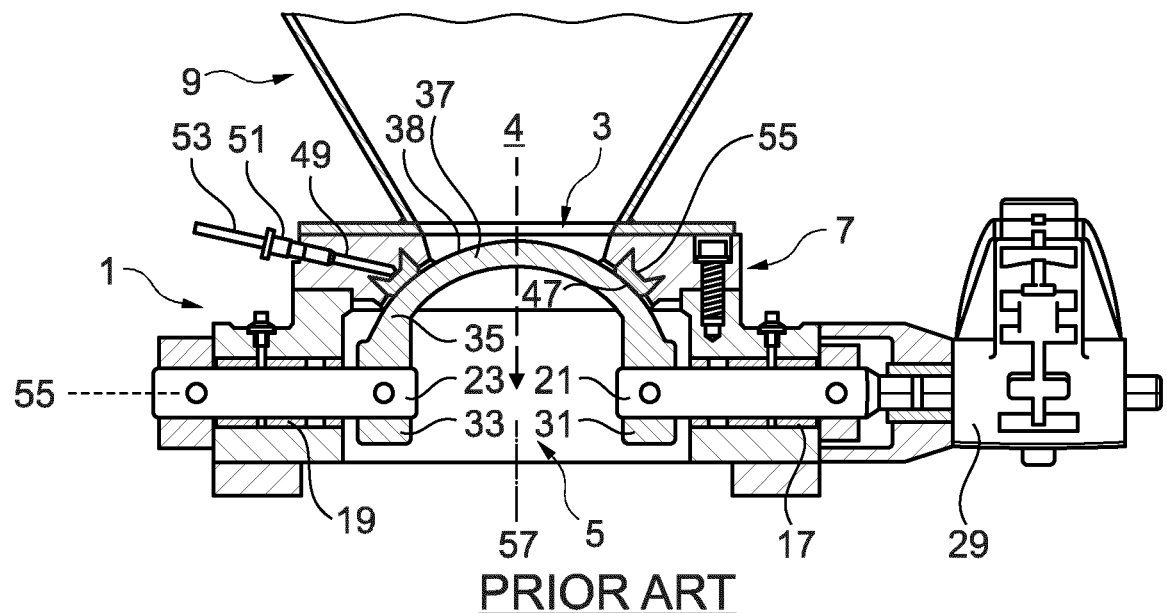
FIG. 1 is a cross sectional side view of a dome valve.
Figure 2:
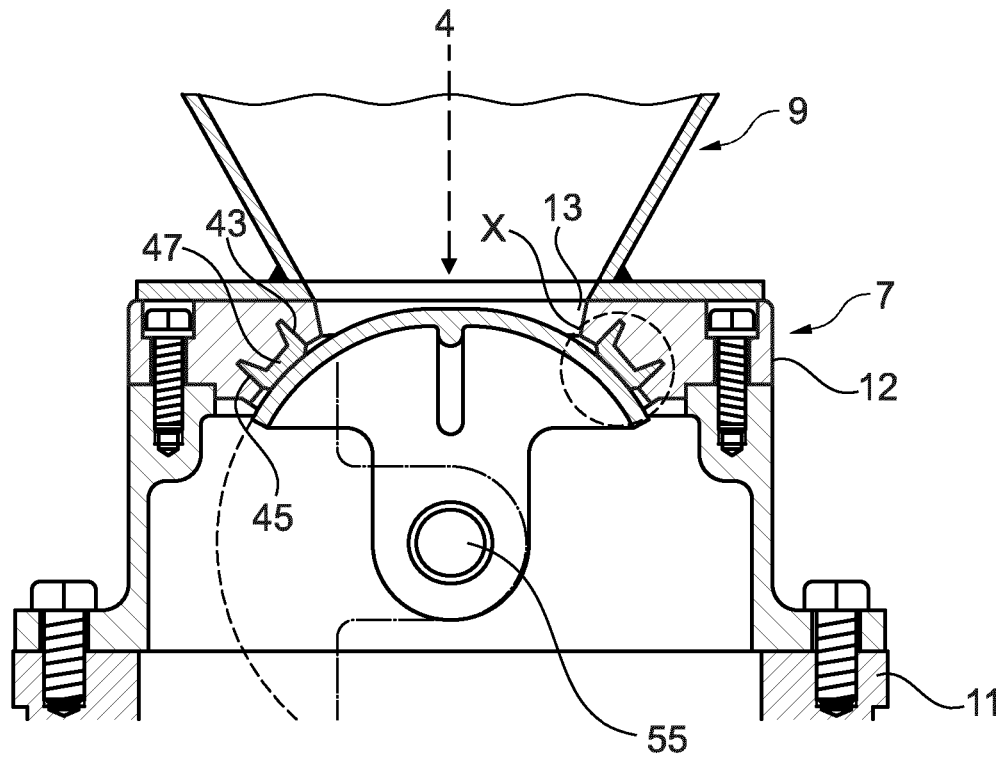
FIG. 2 is another cross sectional side view of the valve in FIG. 1, taken perpendicular thereto.

FIGS. 1 and 2 show cross sections of a prior art dome valve 1, having an inlet 3 and an outlet 5 defined by a body or housing 7. In use, the outlet is typically at a lower pressure than the inlet. The inlet may for example be connected to a pressure vessel, and the outlet to a conveying pipeline.

Particulate material may be delivered using a flow of carrier gas, for example air, from the inlet 3 to the outlet 5, via a fluid passage indicated generally as 4.

In the embodiment shown, the body 7 is bolted at its outlet end to a flange 11 at the inlet to a conveying pipeline (not shown). Other connections may be used, such as a tri-clover fitting or the like. At its inlet end, the body 7 is similarly coupled to the outlet of a pressure vessel 9.

As seen best in FIG. 1, the valve 1 includes diametrically opposite disposed bearing arrangements 17 and 19 around a drive shaft 21 and a pivot shaft 23 respectively.

Drive shaft 21 extends outwardly beyond bearing arrangement 17 to an external drive motor 29, by which the closure member 37 is rotated between opened and closed positions, in use.

The inward ends of drive shaft 21 and pivot shaft 23 are each attached to a respective downwardly depending portion 31, 33 of the closure member 35.

The closure member 35 includes a domed portion 37, which defines a convex sealing surface 38, oriented towards the inlet 3, when the closure member 35 is in the closed position as shown in FIG. 1.

Integral with portions 31 and 33 is a closure member 37 which has the shape of part of a spherical shell. The arrangement is such that the common axis of shafts 21 and 23 passes through the centre of the spherical shell of which closure member 37 forms a part. Rotation of drive shaft 21 by means of motor 29, through an angle of approximately 90 degrees in this embodiment, causes closure member 35 to move from its closed position (shown in full lines in FIG. 2) to its open position, shown in dotted lines in FIG. 2, in which the closure member is moved out of the fluid passage 4 and fluid is able to flow through the fluid passage 4 from the inlet 3 to the outlet 5.

The axis 55 about which the closure member 35 rotates is, in the embodiment shown, perpendicular and intersects with, a central axis 57. The fluid passage, closure member and sealing ring are circularly symmetric about the axis 57.

Accordingly, the sealing surface 38 is a part spherical surface. In alternative embodiments, as disclosed above, other geometries are used.

The inlet portion 12 of the body 7 includes an annular surface 43 which is contoured to match the curvature of closure member 35. When the closure member 35 is in its closed position curved surface 43 lies closely adjacent the convex sealing surface 38. An annular recess 45 is formed in surface 43 and located in recess 45 is an annular resilient sealing ring 47. The sealing ring 47 is bonded or otherwise coupled to the walls of recess 45 except at a central portion thereof, where a pressurisable volume, annular space 55 is defined between the sealing ring 47 and the body 7. The sealing ring 47 is made of a flexible and resilient hard wearing material, such as an elastomer as disclosed herein.

Extending through the inlet portion 12 of valve assembly 1 is a bore 49 which opens at one end into the annular space 55 and is connected at a connector 51 to a compressed air line 53.

When closure member 37 is in its closed position, the sealing ring 47 is moveable between a first configuration in which the sealing ring 47 forms a seal around a circumference of the convex sealing surface 38; and a second position in which the valve 1 comprises a circumferential gap 60 (visible in FIG. 3) between the convex sealing surface and the sealing ring. Such movement can be effected by pressurising and depressurising the annular space 55 defined between the sealing ring 47 and the body 7, via the bore 49.

When the sealing ring 47 is in its second configuration, the valve can be opened by rotating the closure member 35 to its open position (dotted lines, FIG. 2). The circumferential gap between the sealing ring 37 and sealing surface 38 ensures that the closure member 35 does not slide against the sealing ring 47 during such rotation, which would otherwise contribute to wear on the relatively soft material of the sealing ring.

The resilient material of the sealing ring 47 is capable of conforming to the sealing surface 38 to form a seal even when small particles are trapped therebetween. Consequently, dome valves of this general type find use in the field of particulate material processing.

It will be appreciated that, provided the air pressure in space 55 is greater than the pressure difference across the closure member 37, then a gas-tight seal will be maintained between the inlet 3 and outlet 5.

Is should be noted that whilst the body 7 of the valve 1 is shown as comprising separate inlet and outlet portions, the body may alternatively be unitary, or may comprise additional components coupled together.

Figure 3:
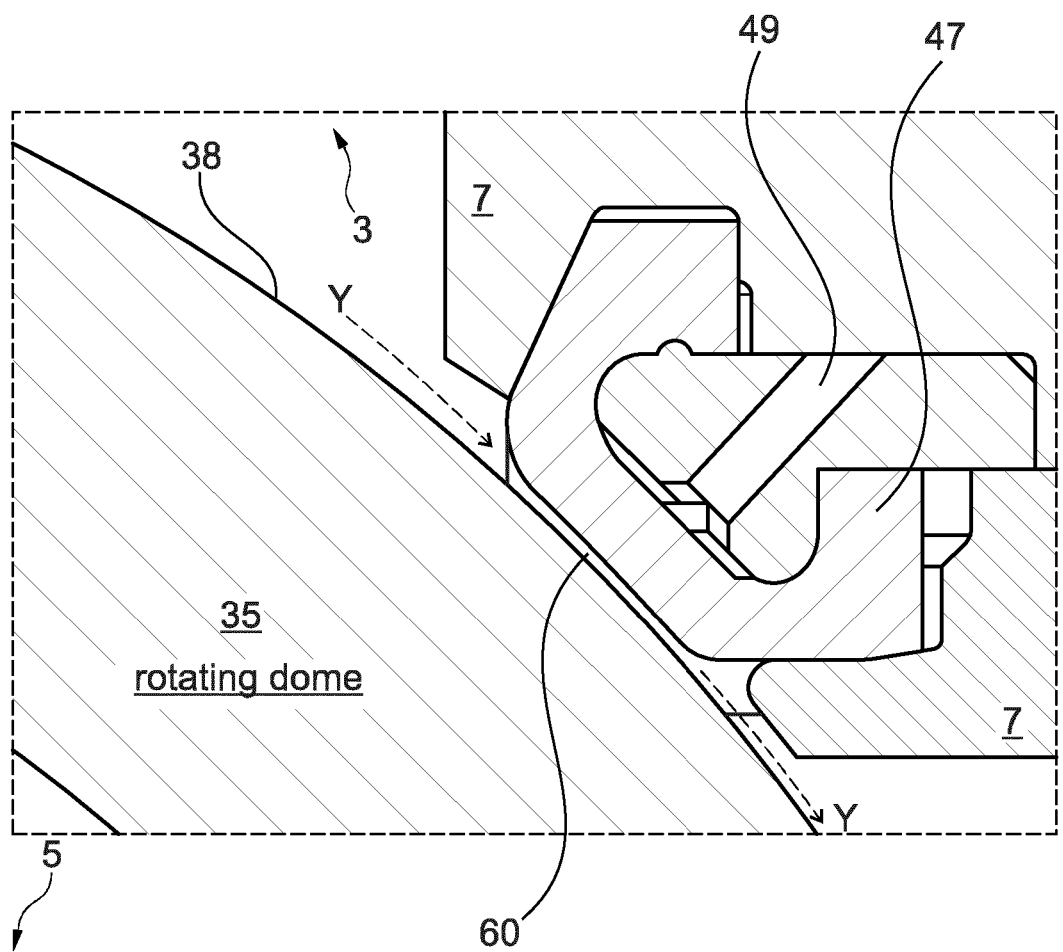
FIG. 3 is an expanded view of region X of FIG. 1.

FIG. 3 shows a close up view of region X of FIG. 2, with the sealing ring 47 in its second (deflated) configuration, defining a gap 60 between the convex sealing surface 38 and the sealing ring 47.

In this configuration, there is a pressure differential across the valve 1, between the inlet 3 and the outlet 5. In use, in the period before the closure member 35 is moved to its opened position, pressurized carrier gas and particulate material flows through this gap 60, generally along the path Y, around the closure member 35. In so doing, the high velocity particulate material wears and erodes the sealing member 47 and, to a lesser extent, the relatively harder domed surface 38 of the closure member 35.

The velocity of the flow of gas increases through the circumferential gap 60 (in comparison to the velocity through the inlet 3). In addition, the dynamic pressure between the closure member 35 and the sealing member 47 is lower than at the inlet 3. This has the effect of driving more fluidized particulate material through the circumferential gap 5, exacerbating the problem of excessive wear.

Figure 4:
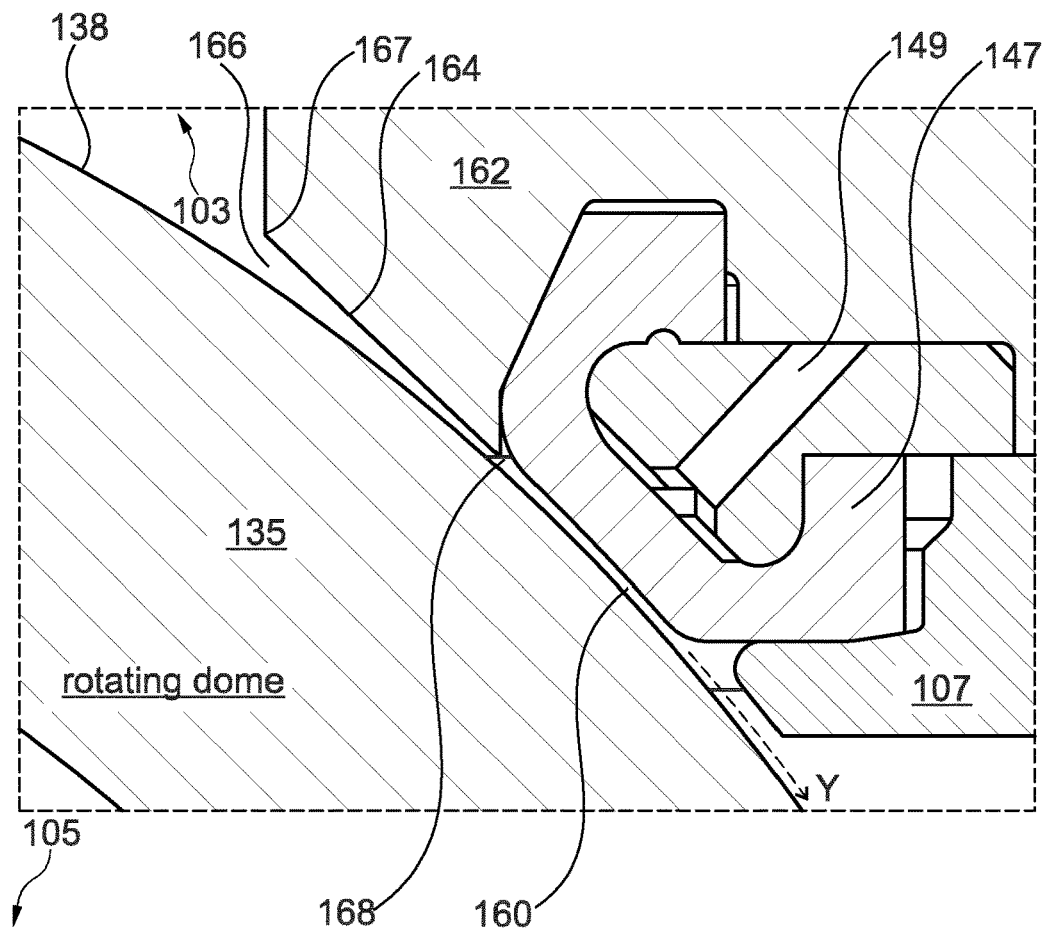
FIG. 4 is an expanded view of a corresponding region X of a valve having an annular clearance defined between a fluid-directing surface and the convex sealing surface of the valve's closure member.
Figure 5:
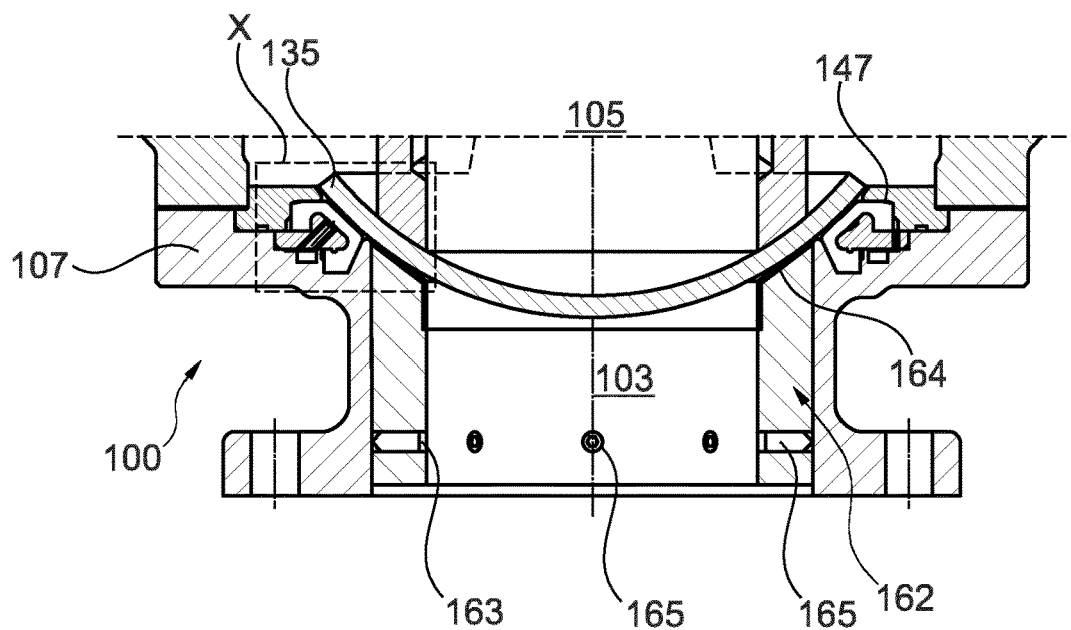
FIG. 5 is across sectional view of the valve having an annular clearance defined between a fluid-directing surface and the convex sealing surface of the valve's closure member.

FIG. 4 shows a close up view of corresponding region X of an embodiment of a valve 100 in accordance with the invention. FIG. 5 shows a cross section of the valve 100, with the region X outlined. Features in common with valve 1 are provided with like reference numerals incremented by 100.

FIG. 4 shows the valve 100 with the sealing ring 147 in its second configuration and the closure member 135 in the closed position. A circumferential gap 160 is defined therebetween.

The valve 100 further includes a fluid-directing member 162, in the form of a cylinder or ring mounted to the body 107 of the valve 100, from the inlet end of the valve. As shown in FIG. 5, the ring is insertable via the inlet 103 and retained in position by grub screws 165, threaded into apertures 163 in the ring 162. The ring 162 has a frusto-conical fluid-directing surface 164 which faces towards the sealing surface 138.

An annular clearance 166 is defined between the convex sealing surface 138 and the fluid-directing surface 164. The annular clearance tapers from its widest point 167, in the direction from the inlet 103 towards the sealing ring 147, to a minimum annular clearance 168.

The minimum annular clearance 168 is less than the circumferential gap 160, in the embodiment shown around 50% thereof. Advantageously, the position of the fluid-directing member, ring 162 can slideably adjusted within the inlet 103 to fine-tune the minimum annular clearance 168. In the embodiment shown, the ring 162 can also be removed from the inlet 103, to be replaced if the surface 164 becomes worn.

In addition, the length of the fluid-directing surface 164 (i.e. measured in cross section through the central axis of the valve 100, generally between 167 and 168) is, in the embodiment shown, around 30 times as large as the minimum annular clearance 168.

In use, when there is a pressure drop from the inlet 103 to the outlet 105, in the period between the sealing ring 147 retracting or deflating and the rotating closure member 135 moving to the open position, particulate material and carrier gas flows from the inlet 103 to the outlet 105 and the velocity of the flow increases to a maximum velocity at the minimum clearance 168. Then, the velocity of the flow decreases through the relatively wider circumferential gap 160.

As the carrier gas and particulate material flows through the tapered annular clearance 166 defined between a fluid-directing surface 164 and the sealing surface 138, the velocity increases gradually.

The method may comprise then flowing the particulate material through the circumferential gap. The velocity of said flow may thereby be reduced, as the circumferential gap is larger than the minimum clearance. The reduction in velocity of flow past the circumferential gap 160 reduces the rate of erosive wear and extends the working lifetime of the valve.

The surface 138 (at least in the region of the annular clearance 166) and the surface 164 may be roughened, to promote "packing" of the particulate material upstream of the minimum annular clearance 168. Such packing of material may significantly reduce overall volume flow rate and also velocity. Potentially, at least in some regions around the periphery of the passage, particulate material may block the annular clearance.

When the rotating closure member 135 begins to open, and packed particulate material begins to break down as the material shears apart. It is therefore desirable that the actuation of the valve opens the closure member is relatively rapid, for example around 0.4 to 1.1 seconds (depending on diameter), which is enough to ensure acceptable seal life.

Whilst various exemplary embodiments have been disclosed, it shall be understood that variations, modifications and combinations of the valve and methods disclosed herein disclosed herein may be made without departing from the scope of the appended claims.

The invention claimed is:

1. A valve comprising:
   a body defining an inlet, an outlet and a fluid passage extending between the inlet and the outlet;
   a closure member disposed in the fluid passage between the inlet and the outlet, having a convex sealing surface;
      wherein the closure member is rotatable between a closed position in which the closure member extends across the fluid passage with the convex sealing surface oriented towards the inlet; and an open position in which fluid is able to flow through the fluid passage from the inlet to the outlet;
   a resilient sealing ring extending around the fluid passage between the inlet and the outlet; and, when the closure member is in the closed position;
      wherein the sealing ring is moveable between a first configuration in which the sealing ring forms a seal around a circumference of the convex sealing surface; and a second position in which the valve comprises a circumferential gap between the convex sealing surface and the sealing ring;
   wherein the body defines a fluid-directing surface extending around the fluid passage between the inlet and the sealing ring; and
   when the closure member is in the closed position, an annular clearance is defined between the fluid-directing surface and the convex sealing surface, which tapers towards the sealing ring to a minimum annular clearance, wherein the minimum annular clearance is less than the circumferential gap.

2. The valve of claim 1, wherein the circumferential gap is at least around 1.5 times, or twice, as large as the minimum annular clearance.

3. The valve of claim 1, wherein the circumferential gap is between around 0.1 mm to 4 mm.

4. The valve of claim 1, wherein fluid-directing surface has a length dimension along the fluid-directing surface in a direction perpendicular to a locus of points around the minimum annular clearance that is at least 10 times as large as the minimum annular clearance.

5. The valve of claim 1, wherein fluid-directing surface has a length dimension along the fluid-directing surface in a direction perpendicular to a locus of points around the minimum annular clearance, and wherein in cross section through the length dimension, the fluid-directing surface is straight.

6. The valve of claim 1, wherein, at least in the region of the fluid-directing surface and the sealing ring, the fluid-directing surface and sealing ring are circularly symmetric around a central axis.

7. The valve of claim 6, wherein the closure member is rotatable around an axis perpendicular to the central axis.

8. The valve of claim 1, wherein the convex sealing surface at least in the region of the annular clearance and/or the fluid-directing surface are provided with a roughened surface finish for promoting packing of particulate material in the annular clearance in use.

9. The valve of claim 1, wherein the fluid-directing surface forms part of a fluid-directing ring, mounted to the body of the valve.

10. The valve of claim 9, wherein the fluid-directing ring is moveable, to allow for adjustment of the minimum annular clearance, and/or wherein the fluid-directing ring is removably mounted to the body, to allow for its replacement.

11. The valve of claim 1, wherein the sealing ring comprises an inflatable portion which in use is pressurised and depressurised to facilitate movement of the sealing ring between the first and second configurations.

12. The valve of claim 1, wherein the minimum annular clearance is positioned in the fluid passage immediately upstream of the circumferential gap.

13. A method of flowing particulate material and carrier gas from an inlet to an outlet of a valve, under the action of a pressure drop across the valve from the inlet to the outlet, the method comprising:
providing the valve having; a closure member disposed in a fluid passage that extends from the inlet to the outlet, the closure member having a convex sealing surface; and a resilient sealing ring extending around the fluid passage between the inlet and the outlet, the sealing ring being in a first configuration in which the sealing ring forms a seal around a circumference of the convex sealing surface;
moving the sealing ring to a second configuration to provide a circumferential gap between the convex sealing surface and the sealing ring;
flowing particulate material and carrier gas from the inlet to the outlet; by increasing the velocity of the flow to a maximum velocity at a minimum clearance between the inlet and the circumferential gap; and then decreasing the velocity of the flow through the circumferential gap.

14. The method of claim 13, wherein increasing the velocity of the flow to a maximum velocity comprises flowing particulate material and carrier gas through a tapered annular clearance defined between a fluid-directing surface and the sealing surface; to a minimum annular clearance that is less than the said circumferential gap.

15. The method of claim 14, comprising flowing particulate material and carrier gas through the tapered annular clearance and then flowing the particulate material through the circumferential gap.

16. The method of claim 13, comprising, after flowing particulate material and carrier gas from the inlet to the outlet, rotating the closure member towards an open position in which fluid is able to flow through the fluid passage from the inlet to the outlet.

17. The method of claim 13, comprising closing the valve, by moving the closure member from the open position to the closed position and subsequently moving the sealing member from the second configuration to the first configuration.

18. The method of claim 13, comprising moving the sealing member between the first and second configurations pneumatically, by inflating/deflating the sealing member.

19. The method of claim 13, comprising flowing particulate material and a carrier gas from the valve inlet and into the valve outlet.

20. A particulate material conveying apparatus comprising a pressure vessel having an outlet port; and a valve therebetween;

wherein the valve has a valve inlet and a valve outlet and the valve inlet is coupled to the pressure vessel outlet; and wherein the valve comprises:

a body defining the inlet, the outlet and a fluid passage extending between the inlet and the outlet;

a closure member disposed in the fluid passage between the inlet and the outlet, having a convex sealing surface;

wherein the closure member is rotatable between a closed position in which the closure member extends across the fluid passage with the convex sealing surface oriented towards the inlet; and an open position in which fluid is able to flow through the fluid passage from the inlet to the outlet;

a resilient sealing ring extending around the fluid passage between the inlet and the outlet; and, when the closure member is in the closed position;

wherein the sealing ring is moveable between a first configuration in which the sealing ring forms a seal around a circumference of the convex sealing surface; and a second position in which the valve comprises a circumferential gap between the convex sealing surface and the sealing ring;

wherein the body defines a fluid-directing surface extending around the fluid passage between the inlet and the sealing ring; and when the closure member is in the closed position, an annular clearance is defined between the fluid-directing surface and the convex sealing surface, which tapers towards the sealing ring to a minimum annular clearance, wherein the minimum annular clearance is less than the circumferential gap.

* * * * *